United States Patent
Kruecker et al.

(10) Patent No.: US 10,027,600 B2
(45) Date of Patent: Jul. 17, 2018

(54) TIME-DIVISION MULTIPLEXING DATA AGGREGATION OVER HIGH SPEED SERIALIZER/DESERIALIZER LANE

(71) Applicant: Artesyn Embedded Computing, Inc., Tempe, AZ (US)

(72) Inventors: Stephan Kruecker, Unterhaching (DE); Armin Jacht, Munich (DE); Reinhold Hofer, Olching (DE)

(73) Assignee: Artesyn Embedded Computing, Inc., Tempe, AZ (US)

( * ) Notice: Subject to any disclaimer, the term of this patent is extended or adjusted under 35 U.S.C. 154(b) by 0 days.

(21) Appl. No.: 14/482,295

(22) Filed: Sep. 10, 2014

(65) Prior Publication Data

US 2016/0072605 A1 Mar. 10, 2016

(51) Int. Cl.
*H04L 12/933* (2013.01)
*H04J 3/04* (2006.01)
*H04Q 11/08* (2006.01)
*H04J 3/16* (2006.01)

(52) U.S. Cl.
CPC ............ *H04L 49/103* (2013.01); *H04J 3/047* (2013.01); *H04Q 11/08* (2013.01); *H04J 3/1623* (2013.01)

(58) Field of Classification Search
None
See application file for complete search history.

(56) References Cited

U.S. PATENT DOCUMENTS

| | | | |
|---|---|---|---|
| 6,188,702 B1 * | 2/2001 | Tornetta | H04J 3/047 341/101 |
| 6,748,469 B1 * | 6/2004 | Caldwell | G06F 13/387 710/313 |
| 6,861,868 B1 * | 3/2005 | Agrawal | H03K 19/17744 326/38 |
| 7,130,276 B2 * | 10/2006 | Chen | H04L 49/30 370/249 |
| 7,242,686 B1 * | 7/2007 | Dougherty | H04L 12/5601 370/395.4 |
| 7,652,598 B2 | 1/2010 | Hazzard et al. | |
| 7,672,300 B1 * | 3/2010 | Medina | H04L 49/30 370/366 |

(Continued)

FOREIGN PATENT DOCUMENTS

| | | |
|---|---|---|
| CN | 101420429 A | 4/2009 |
| CN | 103546299 A | 1/2014 |
| EP | 2688243 A1 | 1/2014 |

OTHER PUBLICATIONS

English Translation of Chinese Office Action for Application No. 201510405908.5, dated Jun. 2, 2017.

(Continued)

*Primary Examiner* — Suk Jin Kang
(74) *Attorney, Agent, or Firm* — Harness, Dickey & Pierce, P.L.C.

(57) ABSTRACT

A digital signal interface includes a multiplexer coupled to receive a plurality of data signals from at least one of a microprocessor, a microcontroller, or a field-programmable gate array (FPGA), the multiplexer multiplexing the plurality of data signals. The interface further includes a serializer/deserializer (SerDes) transceiver coupled to receive the multiplexed data signals, the SerDes transceiver serializing the multiplexed data signals and transmitting the serialized data signals.

13 Claims, 5 Drawing Sheets

(56) References Cited

U.S. PATENT DOCUMENTS

| | | | | |
|---|---|---|---|---|
| 7,994,950 B1* | 8/2011 | Lo | H04L 7/0337 | 341/100 |
| 8,018,924 B1* | 9/2011 | Medina | H04L 49/30 | 370/366 |
| 2002/0191620 A1* | 12/2002 | Chen | H04L 49/30 | 370/401 |
| 2003/0035445 A1* | 2/2003 | Choi | H04J 3/1611 | 370/535 |
| 2003/0112031 A1* | 6/2003 | Agrawal | H03K 19/17744 | 326/41 |
| 2003/0112831 A1* | 6/2003 | Williams | H04Q 11/06 | 370/535 |
| 2004/0120351 A1* | 6/2004 | Li | H04Q 11/04 | 370/498 |
| 2005/0286507 A1* | 12/2005 | sterling | H04L 7/005 | 370/363 |
| 2006/0193347 A1* | 8/2006 | Kong | G06F 13/4295 | 370/503 |
| 2007/0116465 A1* | 5/2007 | Bieker | H04J 3/0682 | 398/70 |
| 2007/0230148 A1* | 10/2007 | Campini | G06F 13/409 | 361/788 |
| 2007/0238326 A1* | 10/2007 | Fallah-Adl | H05K 7/1451 | 439/67 |
| 2008/0147930 A1* | 6/2008 | Su | G11B 33/127 | 710/74 |
| 2008/0181203 A1* | 7/2008 | Jones | H04J 3/1664 | 370/353 |
| 2008/0181212 A1* | 7/2008 | Curcio | H04L 12/66 | 370/389 |
| 2008/0222594 A1* | 9/2008 | Maniloff | H03K 19/1731 | 716/128 |
| 2009/0046745 A1* | 2/2009 | Shin | H04J 3/047 | 370/535 |
| 2009/0183014 A1* | 7/2009 | Chen | G06F 1/266 | 713/300 |
| 2009/0245293 A1* | 10/2009 | Garg | H03M 1/1225 | 370/542 |
| 2010/0150338 A1* | 6/2010 | Nguyen | G06F 13/4291 | 379/412 |
| 2010/0165892 A1* | 7/2010 | Cha | H04W 24/00 | 370/280 |
| 2010/0216390 A1* | 8/2010 | Vaananen | H05K 7/20145 | 454/284 |
| 2011/0099407 A1* | 4/2011 | Jonas | H03K 19/17744 | 713/400 |
| 2012/0038497 A1* | 2/2012 | Ku | H04N 5/04 | 341/100 |
| 2012/0063498 A1* | 3/2012 | Curcio, Jr. | H04L 12/66 | 375/222 |
| 2012/0185707 A1* | 7/2012 | Chen | G06F 1/266 | 713/300 |
| 2012/0243559 A1* | 9/2012 | Pan | H04J 3/1605 | 370/503 |
| 2012/0243560 A1* | 9/2012 | Pan | H04J 3/1605 | 370/517 |
| 2013/0036324 A1* | 2/2013 | Nagasawa | H04L 67/32 | 714/4.11 |
| 2013/0179727 A1* | 7/2013 | Grieco | G06F 11/185 | 714/11 |
| 2013/0201989 A1* | 8/2013 | Hu | H04L 45/24 | 370/392 |
| 2014/0056146 A1* | 2/2014 | Hu | H04L 45/24 | 370/235 |
| 2014/0212128 A1 | 7/2014 | Hirth et al. | | |
| 2015/0173236 A1* | 6/2015 | Pipkin | H05K 7/1445 | 361/796 |
| 2015/0180803 A1* | 6/2015 | Li | H04L 49/15 | 370/458 |
| 2015/0326697 A1* | 11/2015 | Anandakumar | H04L 65/607 | 370/474 |

OTHER PUBLICATIONS

Chinese Office Action for Application No. 201510405908.5 dated Jan. 2, 2018, and its English translation thereof.

* cited by examiner

TIME-DIVISION MULTIPLEXING DATA AGGREGATION OVER HIGH SPEED SERIALIZER/DESERIALIZER LANE

FIELD

The present disclosure relates to time-division multiplexing (TDM) data aggregation over high speed serializer/deserializer (SerDes) lane.

BACKGROUND

This section provides background information related to the present disclosure which is not necessarily prior art.

In current multi-service platforms, a time-division multiplexing (TDM) bus interface connects directly to a line termination card of each individual digital signal processor (DSP) of a plurality of DSPs. As will be discussed further below, examples of the TDM bus interfaces may include a telecom serial interface port (TSIP) and a scalable bandwidth interconnect (SBI). A routing issue may result when the number of TDM signals exiting the TDM bus interface exceeds the number of pins available in a connection between the TDM bus interface and the digital network switch. For example only, parallel unidirectional interfaces, such as SBI, needs about 30 signals. The routing issue may be remedied by an increased printed circuit board (PCB) layer count, which in turn results in loss of space and increased cost. While the above example focuses on the use of DSPs, the use of other devices, such as Field-Programmable Gate Arrays (FPGAs), microprocessors, and microcontrollers, is also contemplated.

Accordingly, there is a significant need for an apparatus and method that addresses the deficiencies of the prior art outlined above.

SUMMARY

This section provides a general summary of the disclosure, and is not a comprehensive disclosure of its full scope or all of its features.

A digital signal interface includes a multiplexer coupled to receive a plurality of data signals from at least one of a microprocessor, a microcontroller, or a field-programmable gate array (FPGA), the multiplexer multiplexing the plurality of data signals. The interface further includes a serializer/deserializer (SerDes) transceiver coupled to receive the multiplexed data signals, the SerDes transceiver serializing the multiplexed data signals and transmitting the serialized data signals.

In other features, a digital signal interface includes a multiplexer coupled to receive a plurality of data signals from at least one of a microprocessor, a microcontroller, or a field-programmable gate array (FPGA), the multiplexer multiplexing the plurality of data. The interface further includes a serializer/deserializer (SerDes) transceiver coupled to receive the multiplexed data signals, the SerDes transceiver serializing the multiplexed data signals and transmitting the serialized data signals, wherein the microprocessor, the microcontroller, or the FPGA supports a time-division multiplexing (TDM) bus protocol.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
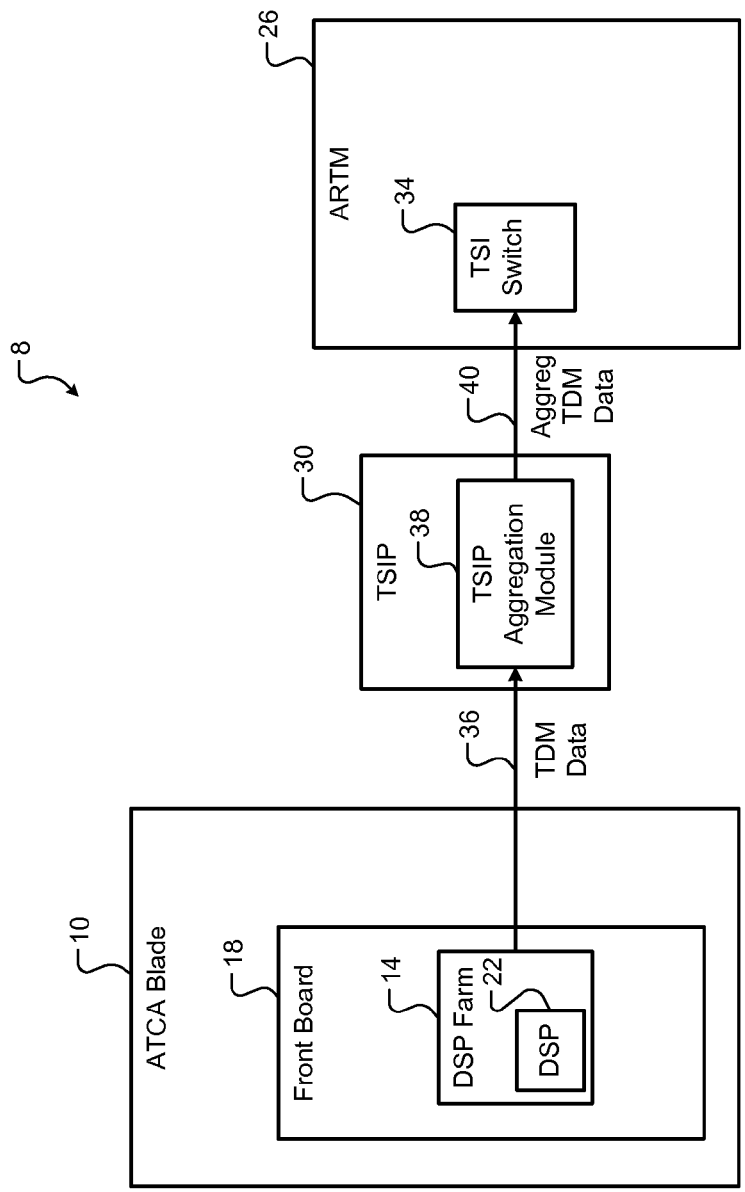
FIG. 1 is a block diagram of a Telecom Serial Interface Port (TSIP) having a TSIP aggregation module according to the present disclosure.

FIG. 1 depicts a data transfer system 8. The data transfer system 8 includes an Advanced Telecommunications Computing Architecture (AdvancedTCA or ATCA) blade 10 having a plurality of digital signal processors (DSPs), also referred to as a DSP farm 14. DSP farm 14 is located on a front board 18 of the ATCA blade 10 and includes one or more DSPs, such as a DSP 22. DSP 22 of DSP farm 14 connects to an Advanced Rear Transition Module (ARTM) 26 via a serial bus interface, e.g., Telecom Serial Interface Port (TSIP) 30. While the present disclosure is directed to an ATCA blade having one DSP farm, it would be understood by one skilled in the art that the ATCA blade could include a plurality of DSP farms. It is further contemplated that Versa Module Europa bus (VMEbus) boards, Advanced Mezzanine Card (AMC) modules, and standard motherboards may be used in place of ATCA blade.

DSP 22 is a microprocessor configured to receive and transmit various types of data, including, for example, digital speech data. DSP 22 may transmit the data using a time-division multiplexing (TDM) method of transmission. TSIP 30 receives TDM data and serves as the medium for transmitting TDM data to ARTM 26.

ARTM 26 is a printed circuit board (PCB) electrically coupled to the front board 18 of ATCA blade 10. ARTM 26 has a variety of rear input/output (I/O) interfaces, thus decoupling such interfaces from the processing activities of front board 18 and increasing the available PCB area for performing various functions. ARTM 26 includes a field programmable gate array (FPGA) having a time slot interchange (TSI) switch 34. TSI switch 34 is a network switch having a set of inputs and outputs and is controlled by a microprocessor. TSI switch 34 uses random access memory (RAM) for mapping and a counter. TSI switch 34 receives serial data from TSIP 30 via the inputs and converts the data to parallel format. TSI switch 34 stores the parallel data sequentially in memory.

TSIP 30 includes a TSIP aggregation module 38. TSIP aggregation module 38 receives the TDM data from DSP farm 14, as indicated by 36. TSIP aggregation module 38 then aggregates the TDM data. TSIP aggregation module 38 transfers aggregated TDM data to TSI switch 34, as indicated by 40. TSIP aggregation module 38 addresses routing issues where the number of TDM signals would otherwise exceed the number of pins available between TDM bus interface 30 and the network switch 34. TSIP aggregation module 38 can also simplify the PCB layer count. While the present disclosure is directed to a TSIP interface, it would be understood by one skilled in the art that other TDM interfaces, such as E1/T1 system packet interface (SPI) packet over synchronous optical network (SONET) physical layer (POS-PHY) level 4, scalable bandwidth interconnect (SBI), high-speed multi vendor interface protocol (HMVIP) and the like, can be used in place of the TSIP interface.

Figure 2:
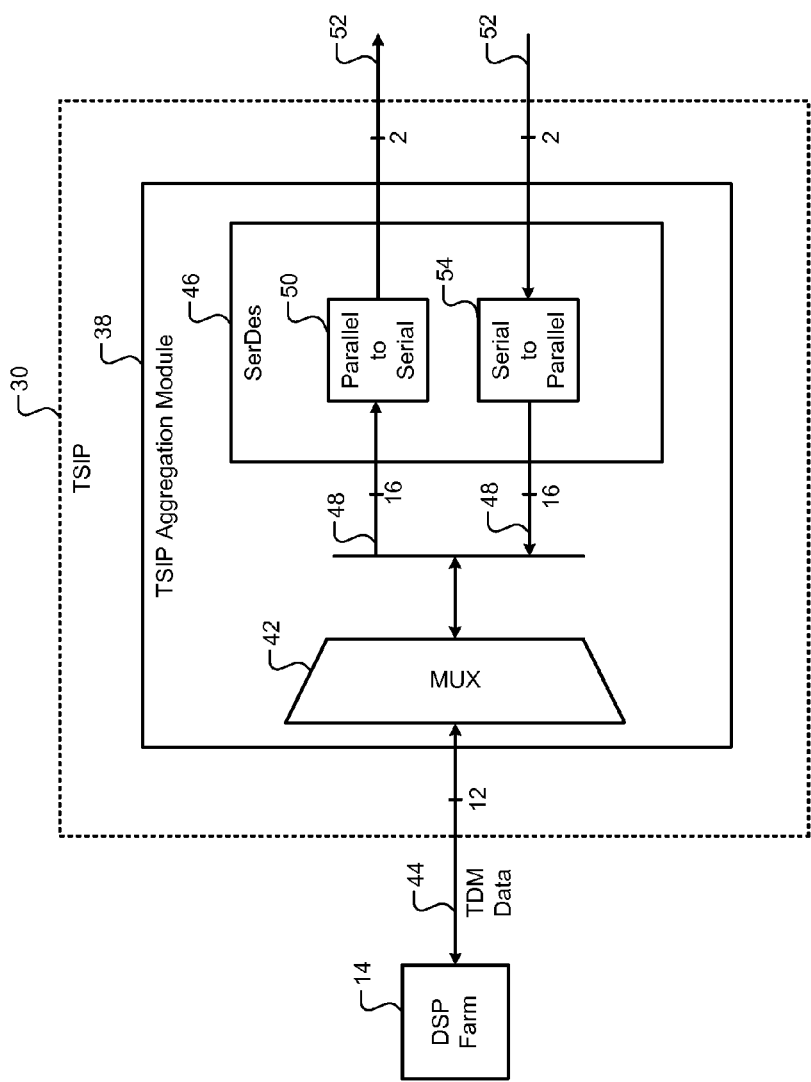
FIG. 2 is a block diagram of a TSIP aggregation module having a SerDes transceiver.

FIG. 2 depicts a block diagram of TSIP aggregation module 38 of the present disclosure. By way of non-limiting example, TSIP 30 includes eight receive signals and eight transmit signals. TSIP 30 is configured to use two frame sync signals, and two serial clocks, for all transmit and receive signals. As a result, at any given time, the interface channel 44 transmits either twelve receive signals or twelve transmit signals. The twelve receive signals or the twelve transmit signals are designated on the TDM data interface channel 44 to TSIP 30 between DSP farm 14 and TSIP aggregation module 38 of FIG. 2.

Figure 3:
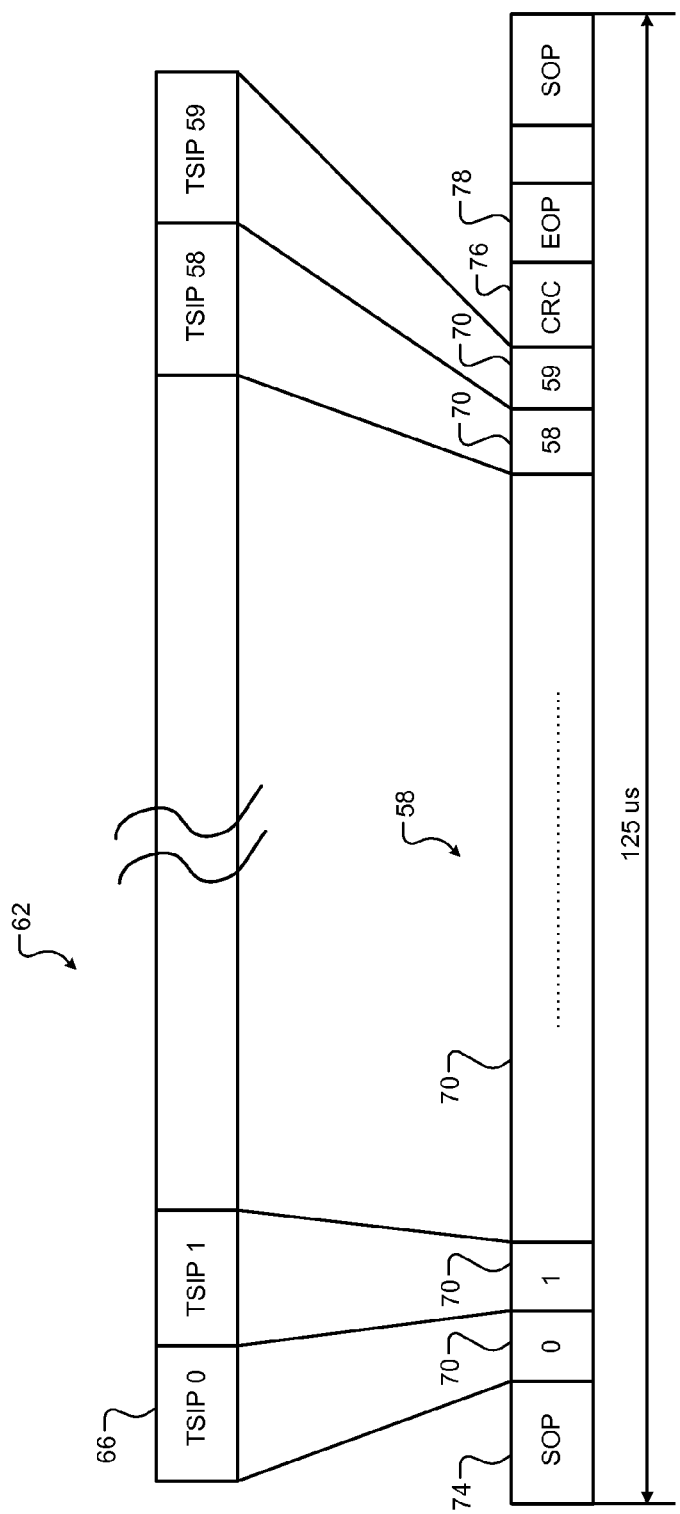
FIG. 3 is a block diagram of a time-division multiplexing (TDM) packet format for a TSIP interface.

FIG. 3 depicts a block diagram of a TDM packet 58 format for a TSIP interface 62. By way of non-limiting example only, the sixty TSIP interface channels 66 transmit sixty TDM data words 70 with start-of-packet (SOP) 74 and end-of-packet (EOP) 78 indicating the respective beginning and ending of the TDM data packet 58. Cyclic redundancy check (CRC) byte 76 of TDM packet 58 contains error-detecting code. TDM packet 58 may repeat at a sampling rate of 125 microseconds (μs).

Referring back to FIG. 2, TSIP aggregation module 38 includes a time slot multiplexer 42 and a serializer/deserializer (SerDes) transceiver 46. The time slot multiplexer 42 multiplexes and demultiplexes the TDM signals. SerDes transceiver 46 includes a parallel-to-serial (PISO) functional block or module 50 and a serial-to-parallel (SIPO) functional block or module 54. By way of non-limiting example, SerDes transceiver 46 uses an 8B/10B SerDes coding scheme. PISO functional block 50 receives a parallel data stream via a 16-channel-wide bus 48 at a speed of 32 megabits per second (Mbit/s) and serializes the received data. PISO functional block 50 transmits serial data via a 2-channel-wide bus 52 at a speed of 2.5 gigabits per second (Gbit/s), (e.g., Ethernet connection).

SIPO functional block 54 of the SerDes transceiver 46 receives a serial data stream via the high speed 2-channel-wide bus 52 and deserializes the received data. SIPO functional block 54 transmits parallel data via the 16-channel-wide bus 48 at a speed of 32 Mbit/s. While the present disclosure is directed to 8B/10B SerDes coding scheme, one skilled in the art would recognize that other SerDes coding schemes may be utilized, such as parallel clock, embedded clock, and the like.

Figure 4:
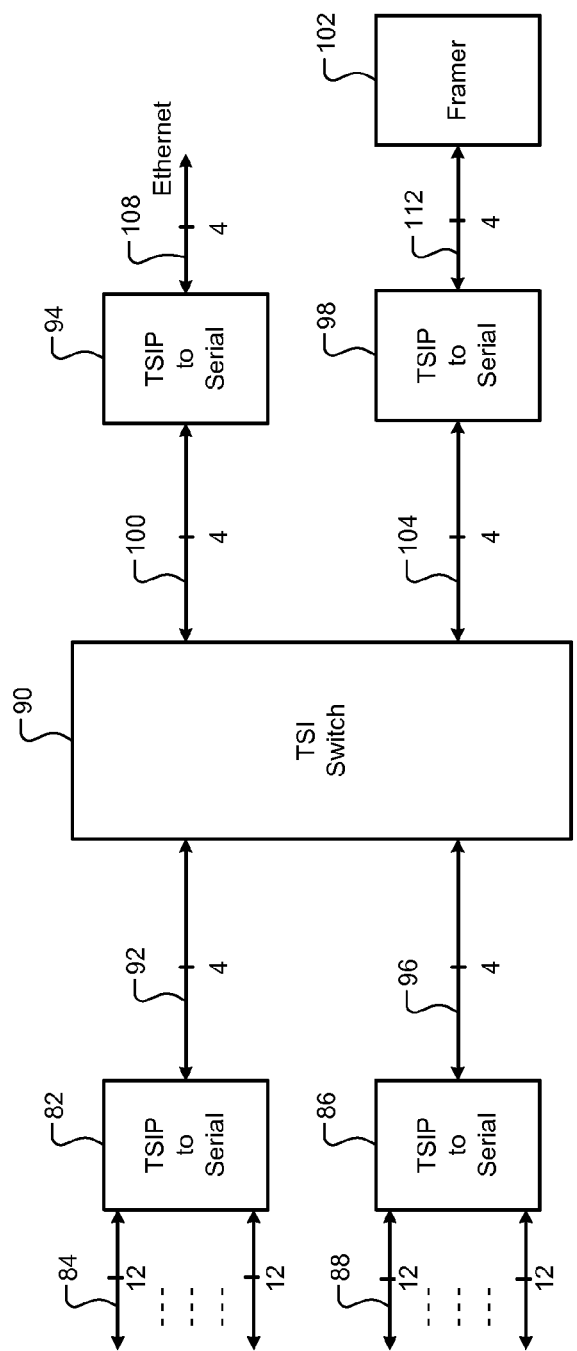
FIG. 4 is a block diagram of a modular implementation of a TSIP interface having a TSIP aggregation module according to the present disclosure.

FIG. 4 depicts a block diagram of a modular implementation of a TSIP interface having a TSIP aggregation module. TSIP 82 and TSIP 86 receive TDM data signals from a DSP farm (not shown) via a plurality of channels 84 and 88, respectively, at a speed of 32 kilohertz (KHz), by way of non-limiting example. TSIP 82 and TSIP 86 each use a TSIP aggregation module, such as described above, to serialize the TDM data stream. TSIP 82 and TSIP 86 transmit TDM data signals to a TSI switch 90 via a plurality of channels 92 and 96, respectively, at a speed of 2.5 Gbit/s, by way of non-limiting example.

The use of the TSIP aggregation module, therefore, reduces pin and trace count in the connection between TSIP 82 and TSIP 86 and TSI switch 90. By way of non-limiting example, TSIP 82 has sixty (60) TSIP interfaces with twelve (12) TDM signals being transmitted per TSIP interface. In a conventional system, the total number of pins needed at TSI switch 90 is sixty channels by twelve lines, or 720 pins. TSIP aggregation module 38 reduces pin count to four (4) pins in the connection between TSIP 82 and TSI switch 90. TSIP 86 operates in a manner similar to TSIP aggregation module 38, as described previously.

TSIP 94 receives TDM data via channels 100 and employs a TSIP aggregation module (not shown) to transmit the data via channels 108 at a speed of 2.5 Gbit/s (e.g., Ethernet), by way of non-limiting example. TSIP 98 receives TDM data via channels 104 and employs a TSIP aggregation module (not shown) in a manner described previously to transmit the data via channels 112 to a framer 102. The framer 102 employs a framing method, as is commonly known in the art, to frame serial data into messages.

Figure 5:
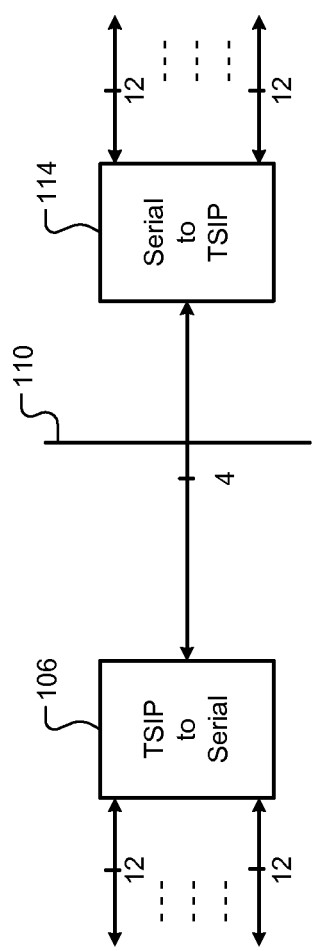
FIG. 5 is a block diagram of a TSIP aggregate device implementation.

FIG. 5 depicts a block diagram of a TSIP aggregation module implementation. TSIP 106 connects to TSIP 114 via a connector 110. Connector 110 may be any type of connector able to facilitate transfer of high-speed differential signals, such as a Universal Serial Bus (USB) connector, as is commonly known in the art. TSIP 106 serializes the received TDM data and transmits the TDM data via the connector 110 at a speed of 2.5 Gbit/s, by way of non-limiting example. TSIP 114 receives the transmitted data and deserializes the received data for transmission in parallel form.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.).

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A digital signal interface, comprising:
    a multiplexer coupled to receive a plurality time division multiplexed (TDM) data signals from a corresponding plurality of digital signal processors (DSP) comprising a DSP farm located on a front board of a telecommunications processing device connected to a rear transition module via a backplane, the multiplexer multiplexing the plurality of parallel data signals, wherein the data signal output by each DSP includes a plurality of output signal lines communicating signals in parallel; and
    a serializer/deserializer (SerDes) transceiver coupled to receive the multiplexed plurality of TDM data signals, the SerDes transceiver serializing the multiplexed plurality of TDM data signals and transmitting the serialized data signals to the rear transition module, the rear transition module including a timeslot interchange (TSI) switch, receiving the serialized data
    wherein each data signal includes a pair of serial clock signals and a pair of frame synchronization signals for receiving and transmitting the parallel data signals.

2. The interface of claim 1, wherein the telecommunications board is an Advanced Telecommunications Computing Architecture (AdvancedTCA or ATCA) blade.

3. The interface of claim 1, wherein the multiplexer and the SerDes transceiver comprise a time-division multiplexing (TDM) interface.

4. The interface of claim 3, wherein the TDM interface is one of a Telecom Serial Interface Port (TSIP), an E1/T1 SPI POS-PHY level 4, a scalable bandwidth interconnect (SBI), or a high-speed multi vendor interface protocol (HMVIP).

5. The interface of claim 1, wherein the SerDes transceiver further comprises a parallel-to-serial (PISO) functional module and a serial-to-parallel (SIPO) functional module and uses an 8B/10B SerDes coding scheme.

6. The interface of claim 1, wherein the SerDes transceiver transmits the serialized data signals to a framer.

7. The interface of claim 1, wherein the SerDes transceiver transmits the serialized data signals to an Ethernet switch.

8. The interface of claim 1, wherein the DSP farm is positioned on at least one of a Versa Module Europa bus (VMEbus) board, an Advanced Mezzanine Card (AMC) module, or a standard motherboard.

9. A digital signal interface, comprising:
    a multiplexer coupled to receive a plurality of time division multiplexed (TDM) data signals from a corresponding plurality of digital signal processors (DSP) comprising a DSP farm located on a front board of a telecommunications processing device connected to a rear transition module via a backplane, the multiplexer multiplexing the plurality of data signals, wherein the data signal output by each DSP includes a plurality of output signal lines communicating signals in parallel; and
    a serializer/deserializer (SerDes) transceiver coupled to receive the multiplexed plurality of TDM data signals, the SerDes transceiver serializing the multiplexed plurality of TDM data signals and transmitting the serialized data signals to the rear transition module, the rear transition module including having a timeslot interchange (TSI) switch receiving the serialized data,
    wherein the front board of the telecommunications processing device communicates using a time-division multiplexing (TDM) bus protocol,
    wherein each data signal includes a pair of serial clock signals and a pair of frame synchronization signals.

10. The interface of claim 9, wherein the SerDes transceiver further comprises a parallel-to-serial (PISO) functional module and a serial-to-parallel (SIPO) functional module and uses an 8B/10B SerDes coding scheme.

11. The interface of claim 9, wherein the DSP farm is positioned on at least one of a Versa Module Europa bus (VMEbus) board, an Advanced Mezzanine Card (AMC) module, or a standard motherboard.

12. The interface of claim 9, wherein the multiplexer and the SerDes transceiver are configured to reside with a time-division multiplexing (TDM) interface.

13. The interface of claim 12, wherein the TDM interface is coupled to a second TDM interface using a connector capable of supporting transfer of high speed differential signals.

* * * * *